United States Patent

Bergmans et al.

[11] 4,110,799
[45] Aug. 29, 1978

[54] SERVO SYSTEM FOR CONTROLLING THE POSITION OF A MAGNETIC HEAD RELATIVE TO A TRACK TO BE FOLLOWED USING PERIODICALLY INTERRUPTED LONG-WAVE POSITIONING SIGNALS

[75] Inventors: Hendrik Jan Bergmans, Eindhoven, Netherlands; Rudolf Drabek, Vienna, Austria

[73] Assignee: U.S. Philips Corporation, New York, N.Y.

[21] Appl. No.: 759,103

[22] Filed: Jan. 13, 1977

[30] Foreign Application Priority Data

Jan. 17, 1976 [NL] Netherlands ..................... 7600470

[51] Int. Cl.² ............................................. G11B 5/00
[52] U.S. Cl. ....................................... 360/70; 360/77
[58] Field of Search .................................. 360/77, 70

[56] References Cited

U.S. PATENT DOCUMENTS

| | | | |
|---|---|---|---|
| 3,404,392 | 10/1968 | Sordello | 360/77 |
| 3,427,606 | 2/1969 | Black et al. | 360/77 |
| 3,479,664 | 11/1969 | Stuart-Williams et al. | 360/77 |

OTHER PUBLICATIONS

IBM Technical Disclosure Bulletin, vol. 18, No. 8, Jan. 1976, pp. 2656–2657.

*Primary Examiner*—John H. Wolff
*Attorney, Agent, or Firm*—Frank R. Trifari; Simon L. Cohen

[57] ABSTRACT

A servo system for controlling the position of a magnetic reading head relative to the center of a selected information track. During writing, long-wave track sensing signals are written below the data signal in parts of the tracks and that in such manner that corresponding parts of successive tracks alternately contain or do not contain track sensing signals. During reading, the head reads not only the information of the selected track but as a result of crosstalk also reads the track sensing signals of the adjacent tracks. After filtering and processing the track sensing signals a control signal for controlling the head is obtained. Application in particular in helical and transversal scan video recorders.

5 Claims, 5 Drawing Figures

SERVO SYSTEM FOR CONTROLLING THE POSITION OF A MAGNETIC HEAD RELATIVE TO A TRACK TO BE FOLLOWED USING PERIODICALLY INTERRUPTED LONG-WAVE POSITIONING SIGNALS

The invention relates to a servo system for controlling the position of a magnetic reading head relative to a selected track to be followed on a magnetizable recording medium which is relatively movable with respect to the head. The system comprises a number of juxtaposed tracks, and is provided with writing means for writing in the tracks track sensing signals which can be distinguished from each other, a reading head for reading the information content of a selected track which is to be followed by the reading head and the simultaneous reading of track sensing signals which are present on the tracks adjoining the selected track for the information of a composite signal, a circuit arrangement for separating the relevant track sensing signals from the information signal of the selected track and for deriving a servo signal from the track sensing signals, and correction means for correcting the position of the reading head relative to the selected track in response to the addition of the servo signal.

In magnetic recording and reproducing devices in which information is recorded in tracks on a magnetizable recording medium and is read out again by means of magnetic heads, it is of importance that upon reading the reading head be accurately positioned above the desired track. The degree of accuracy with which the reading head can be positioned determines the distance necessary between adjacent tracks and thus influences the storage efficiency, that is the number of information units which can be stored per unit of surface of the recording medium. For increasing the accuracy with which the tracks are followed ("tracking accuracy") several servo systems for controlling the position of the reading heads have been suggested which relate both to the centering of a head on the track in a video recorder and the positioning of the head in a magnetic disk memory.

A device of the kind mentioned in the preamble which relates to the positioning of the head in a magnetic disk memory is disclosed in U.S. Pat. No. 3,491,347. The particularity of the device described in the said patent is that the buffer zones which are normally used between the tracks have been eliminated so that a greater information density is achieved. Upon reading a selected track, signals of the adjacent tracks produce crosstalk as a result of the absence of buffer zones. By means of a device for the filtering and logic handling of the total read signal, a centering signal is derived which in value and sign corresponds to the difference in amplitude of the crosstalk signals of the adjacent tracks. If the centering signal is to be satisfactorily derivable, the tracks present beside a selected track must have distinguishable characteristics, which is realized in the known device by modulating the information signals contained in each track of every group of three successive tracks on a different carrier. The carriers may differ either in frequency or in phase. A drawback of this is that, when using more than one carrier frequency, the carrier frequencies for providing distinguishable characteristics must differ by at least a factor 1½, so that a limit is imposed upon the upper frequency limit of the information to be written, while the use of three carrier frequencies necessitates a complicated and hence expensive circuit. When using a carrier of a fixed frequency, either the signals on at least three successive tracks should have different phases, which makes the distinction of the signal from a selected track from that from the adjacent tracks rather difficult, or, when only signals which differ 180° in phase are to be written, always one track should be omitted, so that a servo signal for controlling the position of the head relative to the track to be followed can be derived only on half of the number of tracks. In addition, the absence of the buffer zones has the drawback that the crosstalk of a signal of an adjacent track will become inadmissibly large relative to the informaton signal of the selected track as soon as the head starts travelling partly beside the selected track.

It is the object of the invention to provide a servo system which does not exhibit the above-mentioned drawbacks. For that purpose, the servo system according to the invention is characterized in that the writing means are constructed to write long-wave track sensing signals in parts of the tracks in such manner that corresponding parts of successive tracks alternately contain and do not contain a track sensing signal, the wavelength of the track sensing signals being at least of the same value as the spacing between the tracks.

The system according to the invention is based on the fact that upon reading a given track the condition is used that the low-frequency (long-wave) track sensing signals in the adjacent tracks produce a crosstalk signal in the reading head and are hence also read, while the high-frequency (short-wave) information signals in the adjacent tracks do not produce a signal in the reading head and are hence not read. For a good operation of the system it is required for the wavelength of the track sensing signals to be at least of the same magnitude as the distance between the tracks (the "guard band").

As will be described in greater detail, the writing of the track sensing signals in parts of the tracks has on the one hand the advantage that when using track sensing signals of one fixed frequency which are written with alternate polarities, track sensing information can nevertheless be obtained ("measured") on each track, in which the measurement can be carried out in one or more points of the track dependent upon the number of parts in which a track is divided, and on the other hand the advantage that when using track sensing signals of several frequencies only two different frequencies are necessary.

It is to be noted that when using the measuring system according to the invention is multi-head video recorders the condition is of great importance that the measurement can be carried out on each track. Since the measurement is carried out with all heads, the influence of head errors, if any, on the tracking accuracy becomes smaller (the errors average).

Without departing from the scope of this invention, there are several possibilities for writing the track sensing signals.

A first preferred embodiment of the system according to the invention is characterized in that the writing means are constructed for writing track sensing signals of one fixed frequency and of such a phase that the track sensing signals of tracks directly adjoining a selected track always have an opposite polarity.

The advantage of the above-described system is that it enables the use of a zero method. However, there are certain circumstances in which it is not readily possible to record track sensing signals with a sufficient accuracy in opposite phase on the recording medium.

A second preferred embodiment of the system according to the invention is therefore characterized in that the writing means are constructed to write track sensing signals with two different frequencies in such manner that the track sensing signals of tracks directly adjoining a selected track always have a different frequency.

The system according to the invention is particularly suitable for use in video recorders since an "alien", in this case a track sensing signal, can easily be written below the video signal. Moreover, the frequency of the track searching signals can simply be derived from the line frequency of the video signal.

The invention will be described in greater detail, by way of example, with reference to the drawing.

Figure 1:
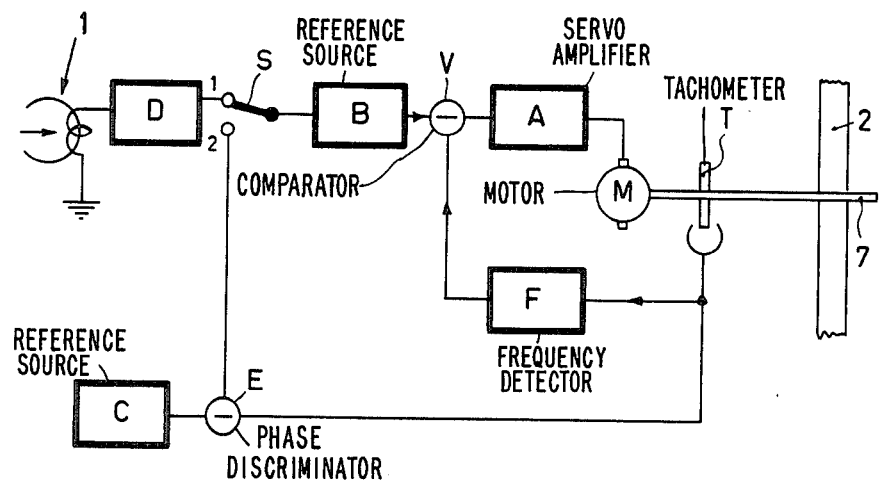
FIG. 1 shows a block diagram of a servo system for controlling the position of the heads in a video recorder.

The servo system according to the invention may be used inter alia both in helical scan type and transversal type video recorders. For that purpose, the diagram of FIG. 1 shows a servo circuit which may be used in both types. Upon reading, the track detection circuit D connected to the magnetic head 1 which is symbolic of all heads which form part of a head wheel of a video recorder (for example two in the case of a helical scan recorder and four in the case of a transversal scan recorder), generates a servo signal which is used to control the reference source B. The switch S then is in position 1 (= reading). The signal of the reference source B is compared by the comparison circuit V with the velocity-proportional signal of the tachometer T obtained via the frequency detector F. The output signal of V controls the servo amplifier A which ultimately controls the velocity of the motor M which drives the tape 2 via the capstan 7. During writing the switch S is in position 2 (= writing). The tape speed is then kept constant by means of the signal from the reference source C which is compared in the phase discriminator E with the tacho signal.

Figure 3:
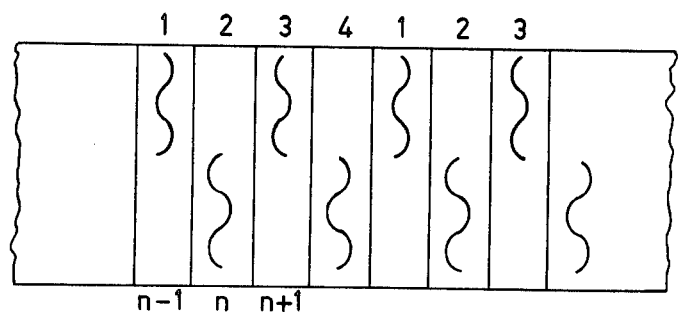
FIG. 3 shows how in the case of FIG. 2 the track sensing signals are recorded on the recording medium.

In order to obtain a servo system for automatically keeping the head 1 centered on the track, said system should comprise a measuring system which can supply a track sensing signal which is a measure of the deviation from the center of the track and which indicates the direction in which the position should be readjusted. For that purpose, according to the invention, long-wave sensing information is recorded in the information tracks themselves, as is shown in FIG. 3. The head should be capable of co-reading the long-wave track sensing information of the tracks present beside the track to be followed.

FIG. 3 shows diagrammatically the situation in which the corresponding parts of the adjacent tracks $n-1$ and $n+1$ of an information track $n$ to be followed comprise track sensing signals of the same wavelength but of opposite phases (and of an essentially longer wavelength than the information signals).

Synchronous detection of the sum of the track sensing signals of the adjacent tracks read by the head 1, to be distinguished from the information signal of the track $n$ to be followed by means of a frequency-selective filter, then provides a control voltage which indicates both the direction and the magnitude of the deviation of the head 2 relative to the center of the track $n$.

Figure 4:
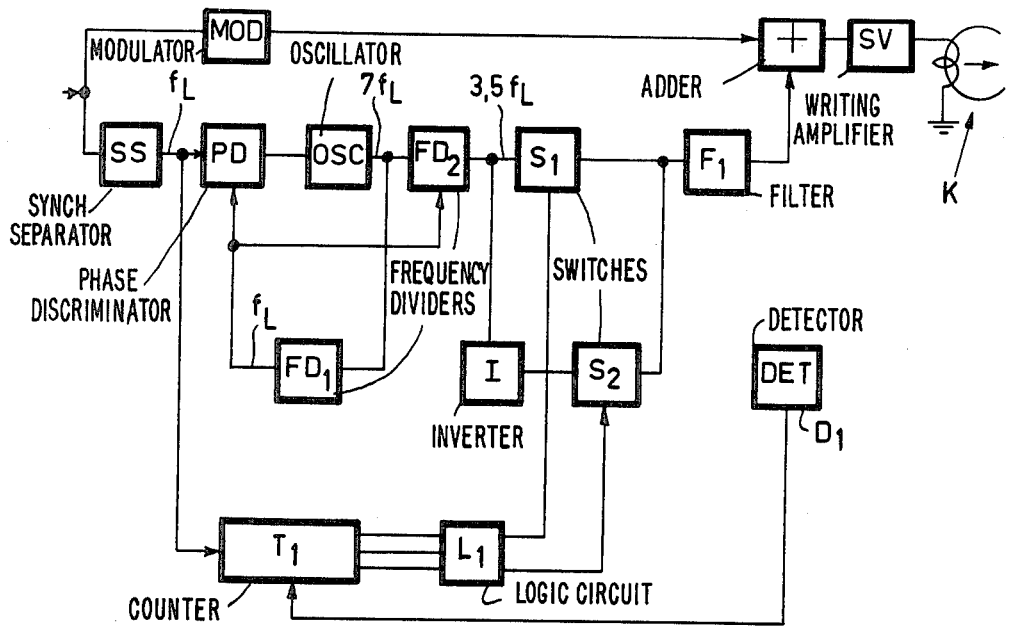
FIG. 4 is a block diagram of a writing circuit which may be used in the recorder of FIG. 1 without departing from the scope of this invention.

FIG. 4 shows a block diagram of the circuit used for writing the configuration of track sensing signals shown in FIG. 3 on a recording medium. In this case, the measuring system forms part of a four-head transversal scan video recorder in which 20 lines per track are written. The frequency of the track sensing signal to be written is coupled to the line frequency of the video signal so as to minimize mutual crosstalk. In the present case the chosen frequency is 3.5 times the line frequency and is obtained as follows. The synchronous separator SS separates the line synchronization signal of frequency $f_L$ from the complete video signal to be recorded. A frequency-controllable oscillator OSC generates a signal the frequency of which is made exactly equal to seven times the line frequency $f_L$ by means of a frequency divider FD1 and a phase discriminator PD. The track sensing frequency 3.5 $f_L$ is obtained by means of the frequency divider FD2 connected to the output of the oscillator OCS.

Figure 2:
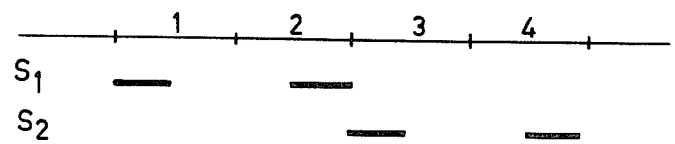
FIG. 2 shows how the heads in a four-head transversal scan recorder are successively energized upon writing track sensing signals.

In order to be able to write the track sensing signal of frequency 3.5 $f_L$ on the desired part of each track, a switching device is present which consists of a switch $S_1$, a switch $S_2$, and an inversion circuit I. The switch $S_1$ and the series arrangement of inversion circuit I and switch $S_2$ are incorporated in two parallel circuits between the frequency divider FD2 and a filter $F_1$ which makes a sinusoidal signal from the ultimately obtained block-shaped track sensing signal. The signals required for controlling the switches $S_1$ and $S_2$ are obtained by means of a logic circuit $L_1$ which receives a block-shaped control signal from counter $T_1$. Said counter $T_1$ receives at its counting input the line synchronization signal of frequency $f_L$ of the synchronization separator SS and receives a signal from a detector $D_1$ at its resetting input. The detector $D_1$ co-operates with the head disk of the present video recorder and provides a detection pulse at the instant at which a certain (hereinafter termed the first) head of the four heads is magnetically coupled to the recording medium. Within the period fixed by two successive detection pulses, the counter $T_1$ provides three symmetric square-wave signals of half a cycle corresponding to ten, twenty, fourty line times, respectively. Said square-wave signals are supplied to the logic circuit $L_1$ which derives herefrom the control signals necessary for the switches $S_1$ and $S_2$. The control signal for the switch $S_1$ is such that said switch passes on the track sensing signal of the oscillator OSC to the filter $F_1$ during the first ten line times out of the twenty line times that the first head is coupled to the recording medium, as well as during the first ten line times out of the twenty line times that the third head is coupled to the recording medium. The control signal for the switch $S_2$ is such that it passes on the track sensing signal inverted by means of the inverter circuit I to the filter $F_1$ during the last ten line periods out of the twenty line times that the second head is coupled to the recording medium, as well as during the last ten line periods out of the twenty line periods that the fourth head is coupled to the recording medium. All this is explained with reference to FIG. 2. FIG. 3 shows how the track sensing signals are ultimately recorded on the recording medium both as regards their periods of time and their mutual phases.

The signal supplied by the filter $F_1$ together with the complete video signal modulated by the frequency modulator MOD is supplied to the input of the writing amplifier SV. The output of the writing amplifier SV is connected to the electric winding of the writing/reading heads of the head disk.

Figure 5:
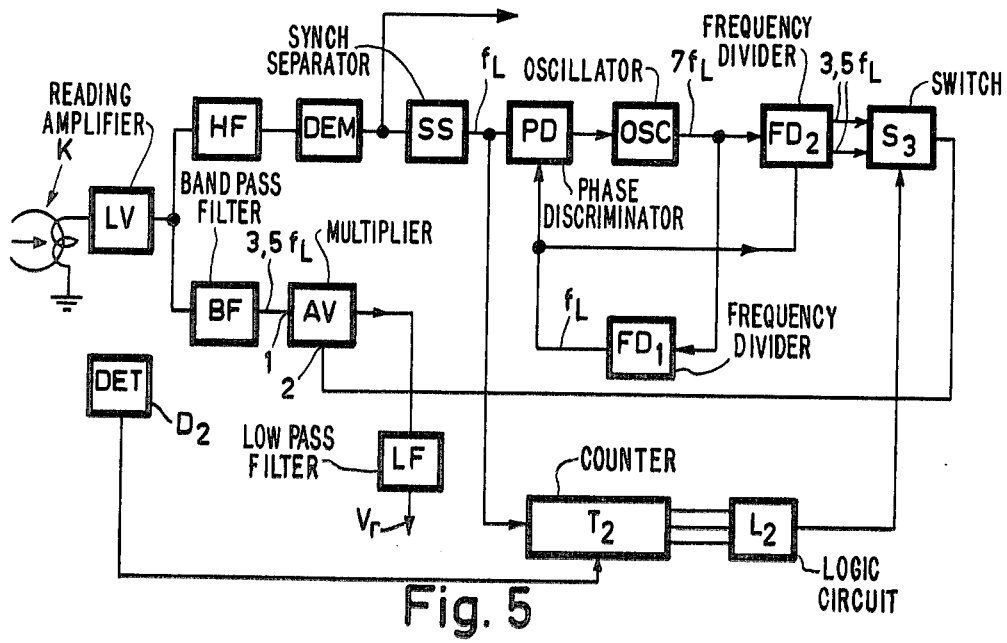
FIG. 5 shows a block diagram of a circuit associated with the circuit shown in FIG. 4 and with which the control voltage for the control of the head position is derived.

FIG. 5 shows a block diagram of the circuit used for reading out the recorded signal which corresponds to the circuit D of FIG. 1. A reading amplifier LV amplifies the composite signal which originates from the writing/reading head K. The track sensing signal of frequency $3.5 f_L$ is separated from the composite signal by means of a band pass filter BF. The output of the filter is connected to an input 1 of an analog multiplier AV. The other input 2 of the analogous multiplier is connected to the output of the switch $S_3$. The signal of frequency $3.5 f_L$ at the output of the switch $S_3$ is derived from the read video signal in the same manner as the track sensing signal was derived during recordings from the signal to be recorded.

A control signal for the switch $S_3$ is obtained in a substantially identical manner as the control signal for the switches $S_1$ and $S_2$ upon recording. Said control signal, however, is now such that the phase of the reference signal of frequency $3.5 f_L$ at the output of said switch is opposite during the reading by the heads 2 and 4 on the one hand and the heads 2 and 3 on the other hand.

After analog multiplication of the signals of the band pass filter BF and the switch $S_3$ by means of the analog multiplier AV, the signal travels through a lowpass filter LF and a direct voltage signal $V_r$ remains which is proportional to the deviation of the head K relative to the center of the selected track. This direct voltage signal may be used to control a (for example, piezoelectric or electromagnetic) actuator on which the head is mounted but is preferably used to control the speed of the motor which drives the tape and hence to keep the head centrally on the selected track as shown in FIG. 1.

Although the track-sensing signals have been described as all having one fixed frequency and phases such that those contained in the two tracks directly adjoining a selected track, will always have opposite phases, it is of course possible to use sensing signals which have properties other than these, provided that the signals derived from the two tracks adjacent a selected track can be distinguished one from the other. Thus, for example, it can be arranged that the track-sensing signals from the two tracks which adjoin a selected track always have different frequencies, provided that the circuit arrangement which derives an error signal from them is modified accordingly.

This could be effected, for example, by replacing in the circuit of FIG. 4 the inverter I by an additional frequency divider connected with its input to the output of the oscillator OSC and with its output to the switch $S_2$. If in this case for example the frequency of the oscillator OSC is chosen to be $35 f_L$ and the frequency divider $FD_1$ to divide by 35 and the frequency divider $FD_2$ to divide by 10 whereas the additional frequency divider divides by 14 two frequencies, one of $2.5; f_L$ and one of $3.5 f_L$ are available to be recorded as track-sensing signals.

The circuit of FIG. 5 could be changed to filter out the two track sensing signals by means of two band-pass filters, one tuned to the frequency of $2.5 f_L$ and the other to the frequency of $3.5 f_L$ the outputs of which are each connected to an amplitude detector the output signals of which can be fed to a differential amplifier of which the output signal is changed of polarity by an additional switch operated by the output signal of the logic circuit $L_2$.

In this circuit the phase-locked loop consisting of the phase discriminator PD the oscillator OSC the frequency dividers $FD_1$ and $FD_2$ respectively and the switch $S_3$ are no longer necessary.

What is claimed is:

1. A servo system for controlling the position of a magnetic reading head, comprising means for writing information signals and periodically interrupted long-wave track sensing signals coinciding with said information signals along the same track in a plurality of juxtaposed tracks, the interrupted portion of each long-wave track sensing signal in any given track being adjacent uninterrupted portions of said long-wave track sensing signals in adjacent tracks, the wavelength of the track sensing signals being at least of the same magnitude as the distance between adjacent tracks, said track sensing signals being distinguishable from each other, a reading head means for reading both said information signals in a selected track and said long-wave sensing signals in adjacent tracks as a composite signal, circuit means for separating said track sensing signals and said information signal from said composite signal and for deriving a servo signal from said track sensing signals, and means for correcting the position of said magnetic reading head in response to said servo signal.

2. A servo system as claimed in claim 1, wherein the writing means are constructed to write track sensing signals of one fixed frequency and of such a phase that the track sensing signals of tracks directly adjoining a selected track always have an opposite polarity.

3. A servo system as claimed in claim 1, wherein the writing means are constructed to write track sensing signals having two different frequencies in such a manner that the track sensing signals of tracks immediately adjoining a selected track have different frequencies.

4. A servo system as claimed in claim 1, for use in a helical scan or transversal scan video recorder, wherein the frequencies of the track sensing signals are coupled to the line frequency of the video signal.

5. A servo system as claimed in claim 4, wherein the frequencies of the track sensing signals are an odd number of times half the line frequency.

* * * * *